March 3, 1942.  W. COLWELL ET AL  2,275,043
UNIVERSAL ANIMAL TRAP
Filed Dec. 18, 1939  2 Sheets-Sheet 1
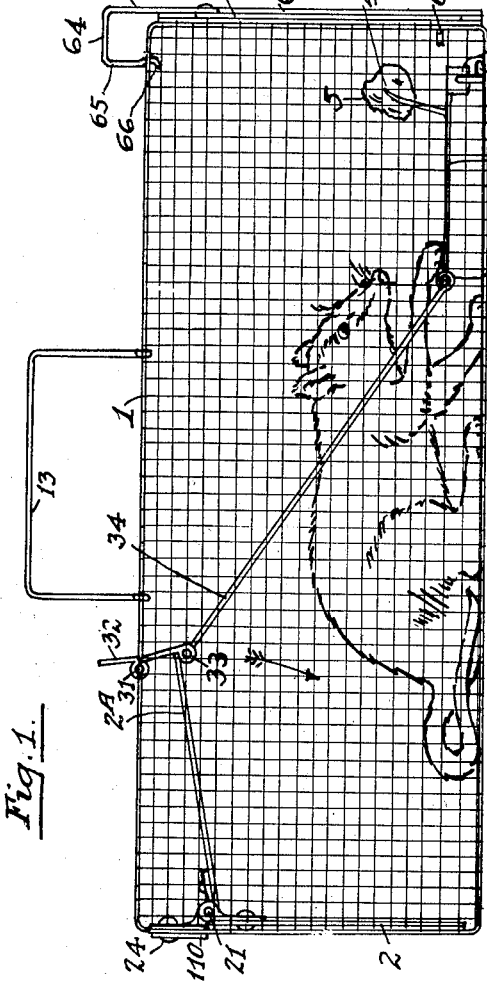
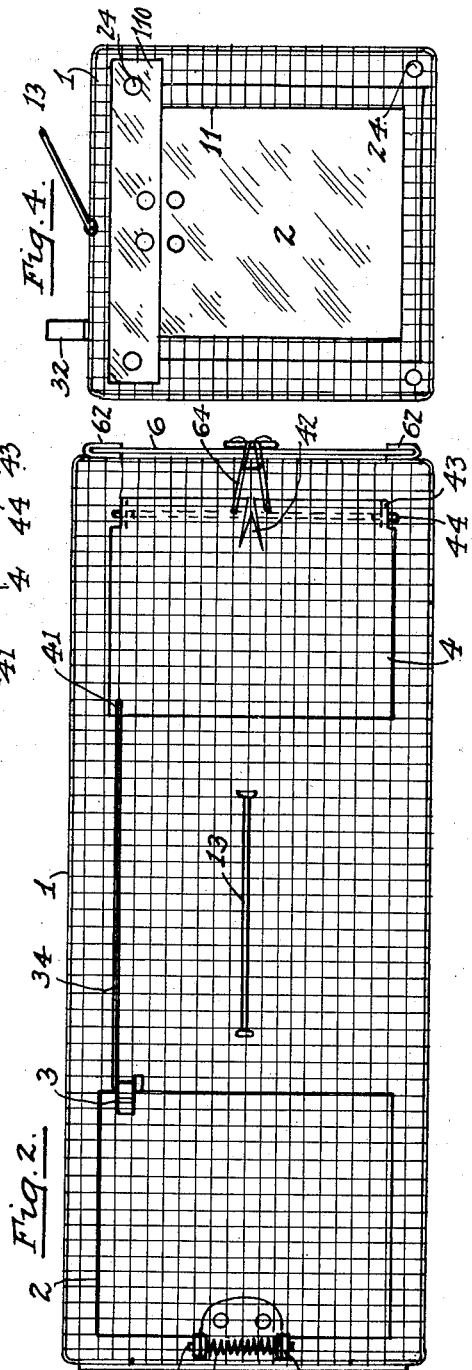
Inventors—
William Colwell
Charles Allen

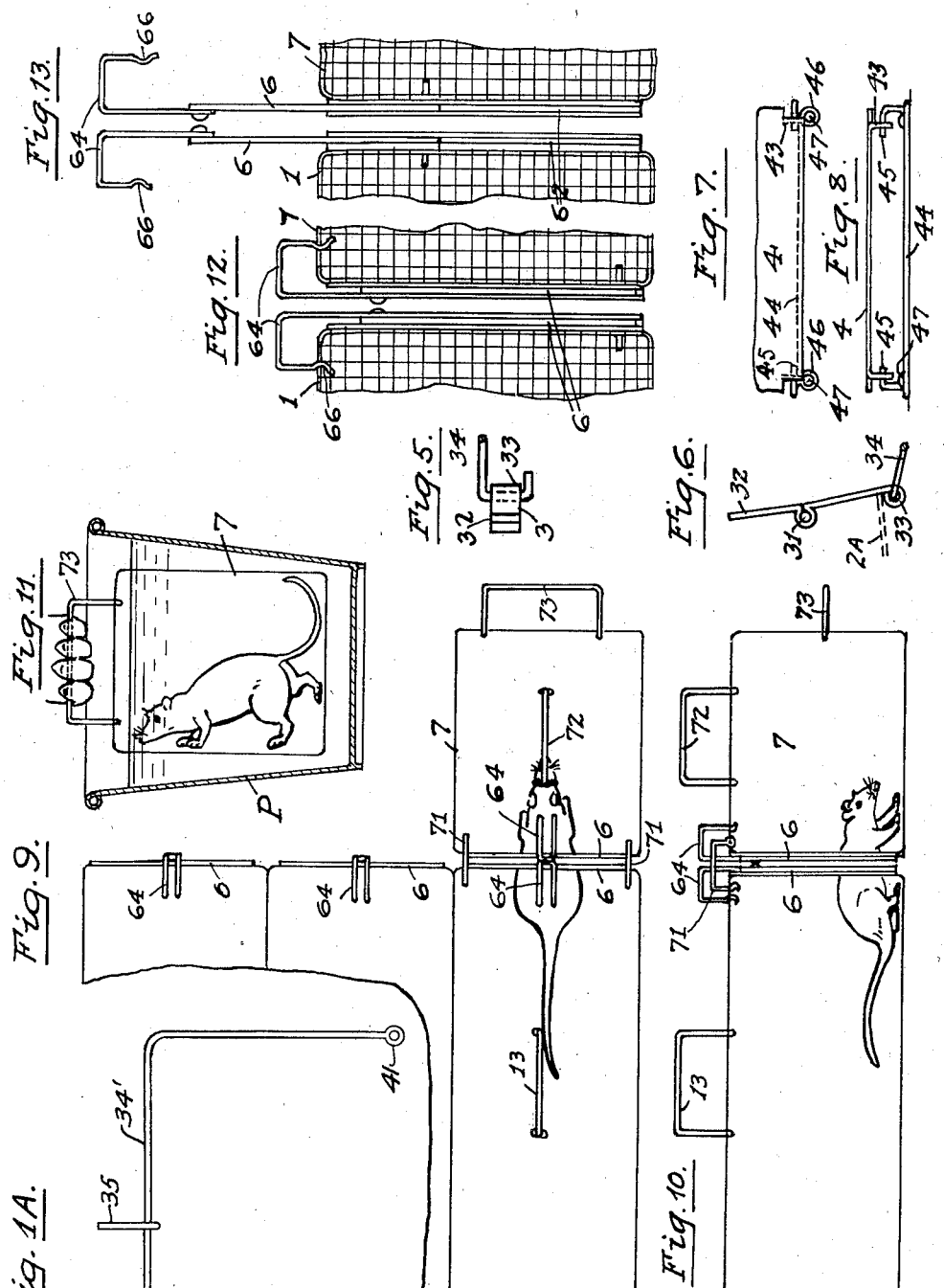

Patented Mar. 3, 1942

2,275,043

UNITED STATES PATENT OFFICE 2,275,043

UNIVERSAL ANIMAL TRAP

William Colwell and Charles Allen, Detroit, Mich., assignors to The Pied-Piper Animal Trap Company, Detroit, Mich.

Application December 18, 1939, Serial No. 309,816

1 Claim. (Cl. 43—61)

This invention relates to animal traps, and its principal object is to provide a trap which is of universal application and may be made in various sizes adapted to catch fur-bearing animals and rodents such as beavers, coneys, foxes, muskrats, mink, and moles, as well as noxious and predatory vermin such as weasels, stoats, rats, mice, and so forth. Such an invention as the present one is especially in demand in towns and cities where, notwithstanding the many traps and other devices which are constantly employed at great expense, the number of rats is increasing at an alarming rate, causing the destruction of millions of dollars worth of food and other merchandise and spreading various virulent diseases among the people.

Many traps of this character as at present constructed have certain parts made of wood and other soft and absorbent material which retain the odors of animal blood, human hands, and so forth, so that after each capture the traps must be cleaned and sterilized by immersion in some form of disinfectant, or subjected to a smoking process to remove these odors, which results in delay in putting the traps into operation again and so reduces the year-around effectiveness of each individual trap.

According to the present invention the trap is made entirely of wire mesh and metal, which is clean and sanitary and does not require frequent cleaning, so that it may be used continuously to catch one animal after another over a considerable period. This construction also results in strength and durability of the traps, which are subjected to considerable rough treatment in use and in transferring from place to place.

Another object of our said invention is to provide a trap which is easily and quickly set without risk of damage to the hands or fingers, and which is maintained securely in both open and closed positions without any special locking devices, so that it may be freely handled and moved about when in set position and cannot be opened by a trapped animal even though it may be turned over in its struggles to escape.

Still another object is to provide a trap of unusual length having an entrance or trap door at one end and at the other end an exit or discharge door through which the captured animal may be withdrawn, and in conjunction with this trap we employ an auxiliary cage or carrier which is provided with means for connecting it to the exit end of the trap and with an entrance door which is brought into alignment with the exit door of the trap so that an animal may be transferred from the trap to the carrier, after which the door of the carrier is closed and the carrier transported to a body of water or other liquid and immersed therein so as to suffocate the animal. By this arrangement the trap and the carrier being provided with safety handles and bails, there is no danger of injury to the operator due to biting and scratching of the imprisoned animal.

It is considered an important feature of the present construction that, in the case of fur-bearing animals or animals required to be kept alive for breeding or other purposes, the capture of the animal and its transference to the carrier is effected without any possible danger of injury to the animal or to the pelt. Further, the trap itself is kept free of the many odors which remain in the ordinary traps and prevent other animals from entering the same.

It is contemplated that a single carrier may be used in conjunction with two, three, or any number of traps, depending on the size and working conditions of the same.

A still further object of our said invention is to provide an apparatus which is simple in construction, having regard to the high efficiency of its operation and which may be manufactured by modern precision methods at a cost even less than the traps now in use.

With these and other objects in view, we will now describe a preferred embodiment of the invention, reference being had to the accompanying drawings, in which—

Figure 1 is a side elevation of the trap.

Figure 1a is a fragmentary side elevation showing a modification.

Figure 2 is a plan view.

Figure 3 is a rear elevation.

Figure 4 is a front elevation.

Figure 5 is a fragmentary plan view drawn to enlarged scale showing details of the safety trigger used to hold the door of the trap open.

Figure 6 is a fragmentary side elevation of the same.

Figure 7 is a fragmentary plan view showing details of the hinge or pivot of the trigger plate.

Figure 8 is a fragmentary rear elevation of the same.

Figure 9 is a diagrammatical plan view showing a series of three traps to one of which is connected the auxiliary cage or carrier.

Figure 10 is a side elevation of the same, and

Figure 11 is a diagram illustrating the method of disposal of the captured animal by immersion of the carrier in a pail of water.

Fig. 12 is a fragmentary view showing the trap and cage secured together and with the sliding gates closed.

Fig. 13 is a fragmentary view showing the trap and cage secured together with the sliding doors open.

Like characters designate corresponding parts throughout the several views.

In the drawings, 1 designates the trap, of substantially rectangular cross section having top, bottom and side members of wire mesh or other reticulated material, while the numerals 11, 12 designate the front or trap opening and the rear or discharge opening respectively. Pivoted to the front end as at 21 is the trap door 2, the pivot means consisting of any usual form of spring hinge 22 secured to the metal cross bar 110 as by rivets 24 and having the torsional spring 23 adapted to normally keep the door 2 in closed position, in which it abuts upon the inner face of the end member of the cage. Pivoted upon the upper wall or top member of the cage is a trigger 3, which hangs by gravity in such position as to engage the lower edge of the trap door when it is raised, against the action of the spring 23, to the open position as indicated at 2A in Figure 1 of the drawings. The trigger 3, as shown more clearly in Figures 5 and 6 of the drawings, consists of a flat strip of spring steel having a central loop 31 adapted to swingably engage one of the transverse wires of the cage, and having at its upper end a thumb piece 32 projecting upon the outside of the cage and at its lower end an inwardly bent eye 33 adapted to engage the door as aforesaid.

Hooked into the eye 33 is the front end of a rod 34 the rear end of which engages a loop 41 upon the forward edge of the trigger plate 4 so that when the said plate is depressed by the animal in reaching for the bait the trigger 3 is withdrawn so as to release the door 2 and thus trap the animal in the well-known manner. The plate 4 has an upwardly extending spike 42, punched out solid with the plate as shown in Figure 2, for receiving the bait 5. Upon the rear edge of the plate are a pair of integral, downwardly extending ears 43 which pivotally engage the inwardly projecting ends 45 of a bent wire member 44, the lower transversely extending portion of which has loops 46 through which pass screws or rivets 47 by which it is secured to the bottom member of the cage.

In the arrangement just described we have a cheap, simple, and practically frictionless trigger mechanism which is brought into action by an extremely light pressure of the animal, so that there is no chance that he can escape and carry the bait with him as sometimes happens with ordinary traps. Also, it will be noted that the door 2 swings inwards so that no amount of force on the part of the animal can possibly open it. In some cases, where more than usual clearance is required, the rod 34 may be bent as shown at 34' in Figure 1a, in which case a loop 35, suspended from the top of the cage, loosely holds the rod in position.

Exteriorly of the rear end of the cage, and secured thereto as by rivets 61 are a pair of vertical guide members of channel shape 62 in which slidably engage the edges of a gate 6 which is used for applying the bait to the trigger plate and also for withdrawing the trapped animal. To the upper edge of the gate is secured an upwardly extending wire member 63 which has upper horizontal portions 64 to form handles and two downwardly extending portions 65 which terminate in hooked members 66 adapted to engage the wire members of the top of the cage and maintain the gate in closed position. A projection 67 upon the gate comes in contact with the top of the opening 12 so as to limit its upward movement. A bail 13 serves for carrying the cage from place to place.

The transfer cage or carrier 7 is of similar construction to the cage but of greatly reduced length, and at one end it is provided with a vertically sliding gate 6 adapted to be brought into coincidence with the one in the rear of the cage 1. This gate has also the combined handles and locking means 64, 66 above described. Upon the upper surface of the carrier are a pair of pivotally mounted hooks 71 the free ends of which engage the adjacent portions of the cage, thereby holding the cage and carrier in abutting and aligned positions, so that when the gates are lifted by means of the handles 64, the animal is conducted from the cage to the carrier as above recited. The carrier has an upper bail 72 for transportation and an end bail 73 by which it may be held when suspending the carrier, as in the pail of liquid P in Figure 11, so as to drown the animal. The bails are so proportioned and located that there is no possible chance of the animal reaching the hand of the operator.

It will be observed from the foregoing description that we have provided a trap which is simple in construction and efficient in operation and which is well adapted for the purpose set forth, and while we have herein described and shown a preferred modification of our said invention, it will be understood by those skilled in the art to which the same pertains that various changes and modifications in detail may be made to suit any particular or peculiar requirements without departing from the spirit of our invention as defined in the appended claim.

Having thus described our said invention, what we claim and desire to secure by Letters Patent of the United States is:

A box trap comprising a rectangularly-shaped cage having at one end a spring-closed entrance door, a trigger for holding said entrance door in open position, a bait-holding member operatively connected to said trigger whereby pressure upon said member releases said trigger and allows said door to close and to entrap an animal, an exit opening at the other end of said trap, a sliding gate for closing said exit opening, an auxiliary cage having an opening corresponding to said exit opening, a sliding gate for closing said last-named opening, a pair of hook members pivoted to said auxiliary cage and adapted to engage said trap adjacent said exit opening and to detachably hold said trap and said auxiliary cage in co-operative relation, whereby an animal may be transferred to said auxiliary cage, and handle members including locking means for the same operatively connected to said sliding gates and arranged in juxtaposition for simultaneous operation, said hook members and said handle members extending above the top of the trap whereby they may be operated without possibility of damage or infection from a trapped animal.

WILLIAM COLWELL.
CHARLES ALLEN.